Figure 1:
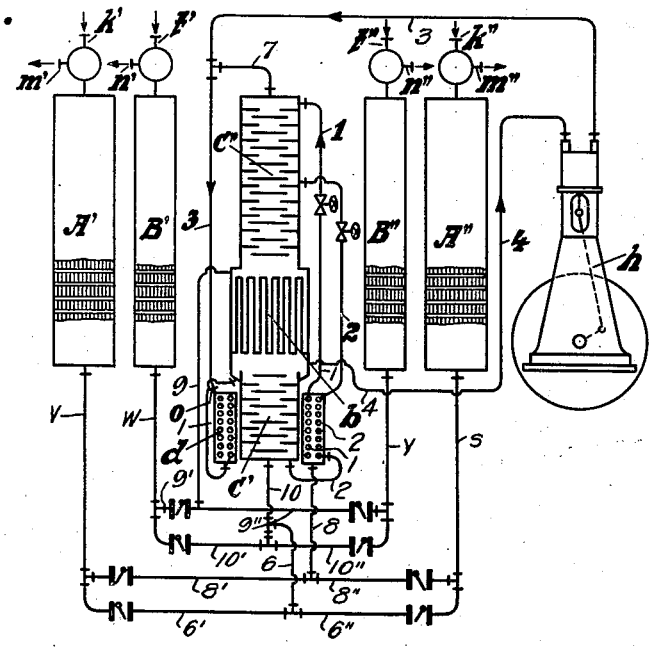

Jan. 29, 1935.  M. FRÄNKL  1,989,190
APPARATUS FOR SEPARATING LOW BOILING GAS MIXTURES
Original Filed March 19, 1930

INVENTOR
MATHIAS FRÄNKL
BY
ATTORNEYS

Patented Jan. 29, 1935

1,989,190

UNITED STATES PATENT OFFICE 1,989,190

APPARATUS FOR SEPARATING LOW BOILING GAS MIXTURES

Mathias Fränkl, Augsburg, Germany, assignor to American Oxythermic Corporation, New York, N. Y., a corporation of Delaware Original application March 19, 1930, Serial No. 437,204. Divided and this application July 29, 1931, Serial No. 553,768. In Germany April 19, 1929

6 Claims. (Cl. 62—123)

This invention relates to improvements in an apparatus for the separation of gas mixtures containing lower and higher boiling components and also other components, such as water and carbon dioxide which boil at still higher temperatures in such a way that continuous operation in a simple and economical manner is insured. This application is a division of my co-pending application, Serial No. 437,204, filed March 19, 1930.

The separation of low boiling gas mixtures, for example air, into their main components as heretofore practiced is accompanied by a number of difficulties which have complicated and increased the cost of operation. One of the major difficulties was due to the fact that the moisture and the carbon dioxide, or other comparatively high boiling components, in the air or other gas mixture precipitated as ice or snow in the tubular counter-current cold exchangers hitherto employed and thereby clogged the apparatus. The exchangers used in the known processes therefore had to be thawed out regularly after a shorter or longer operating period, even if the gas mixture had been previously chemically and/or thermally treated. Secondly, the economy of existing processes is greatly reduced because in order to cover the cold losses, at least a portion of the air to be separated has to be compressed to a higher pressure than is required for the separation itself, so that a large expenditure of power in the compressor is necessary.

Furthermore, a loss of energy arises in that a considerable portion (up to about twenty per cent) of the washing liquid which has been liquefied at 3 to 4 atmospheres (i. e. above atmospheric), is always again vaporized when the liquid is reduced to the lower pressure in the upper rectifier. Finally, all of the prior processes with the exception of that of Lachmann (German Patent No. 167.931) are based upon total liquefaction of the gas mixture to be separated which, as is known, requires a greater amount of power than partial liquefaction. The process of Lachmann has, however, the disadvantage that the removal of moisture and of carbon dioxide from the mixture to be separated is rendered very difficult because a rather large part of the mixture is separated at practically atmospheric pressure.

The present invention is an improvement over my co-pending application, Serial No. 81,723, filed January 16, 1926, and granted as Letters Patent 1,890,646, December 13, 1932 in which a novel process and apparatus are disclosed for separating low boiling gas mixtures. A number of cold accumulators or regenerators of large cold-absorbing capacity are employed through which the warm incoming gas mixture and cold separated components are alternately passed with periodically reversed operation, so that, for example, currents of warm air are introduced through the same regenerators and through the same packing-filled spaces that the cold separated oxygen and nitrogen traversed during the previous operating period. The regenerators are filled with a regenerative body as a metallic packing in the form of layers of corrugated sheet metal, for example of 1 mm. thickness, which are so positioned that the several layers, each of a height of for example about 25 mm., are in contact with each other only by means of interposed iron rods which serve to check the metallic conduction of the cold.

When a gas mixture containing what may be considered high boiling impurities, such as air which has not been previously treated to remove its moisture and carbon dioxide content, or from which these substances have been only partially removed, is conducted to the separating apparatus described in application Serial No. 81,723, these high boiling components (i. e. the water and carbon dioxide) will be deposited in the form of ice and frost in the regenerators. When such vapor and carbon dioxide-laden air, or similar gas mixture, is used, it is essential that the ice and frost deposited in the regenerators by the incoming gas mixture during any operating period be completely sublimed and carried off by the discharging separated components which pass through such regenerators during the following period when the flow of the gas mixture and separated components has been reversed. The regenerators otherwise will gradually become clogged with ice, and the operation of the apparatus will be disturbed and its continuity interrupted.

I have found that the accumulation of frost and ice in the cold regenerators or accumulators can be economically prevented without interruption of operation by so conducting the gas separation process that, among other things, a large volume differential exists between the incoming mixture and the discharging separated components. Thereby the complete removal of the deposited material by sublimation by the separated components as they leave the apparatus is insured. The use of the cold exchange system operating with periodic reversal, and with sublimation of solidified high boiling impurities is of particular economy when the gas mixture does not have to be compressed much above 4 atmospheres. It will be understood that pressures referred to herein are gauge i. e., above atmospheric, unless otherwise stated. The losses in compression energy otherwise become very noticeable because upon every reversal, e. g., about every three minutes, the volume of compressed air in the cold accumulators is lost and must be replaced.

It is an object of the present invention to provide an apparatus for the separation of gaseous mixtures employing the principle of cold regeneration with periodically reversed operation and in which the accumulation of precipitated high boiling impurities in the regenerators (accumulators) is prevented in a simple and economical manner. The apparatus operates under a low pressure with partial liquefaction yet total compression of a gaseous mixture but without overcompression (i. e. above the condenser pressure required to effect the separation), in combination with a periodically reversed operation of cold accumulators which effects a transfer of the high boiling impurities, such as moisture and carbon dioxide, to the separated products, and in combination with an expansion of the available excess of low pressure gas with performance of work. Such a method of operation, furthermore, is advantageous because the losses of wash liquid due to evaporation during expansion from condenser pressure in a rectifier in which liquid is formed and preliminarily separated to a lower pressure in another rectifier of the separating apparatus are in large measure avoided.

The partial liquefaction of the gas mixture is apparently in contradiction to the total compression of the gas mixture, for the partial liquefaction should, it would seem, be based upon partial compression. The removal by sublimation of the frost deposited by the water vapor and carbon dioxide content of the gas mixture, however, makes compression of all of the gas mixture necessary in order to produce the required volume differential between the incoming mixture and the discharging separated components. Accordingly, the removal of the frost has to be accomplished at the cost of the increased power expenditure involved in compressing all of the gas mixture to condenser pressure.

This apparent sacrifice is, however, compensated for by the fact that a portion of the excess of the compressed low pressure gas mixture, either before or after a preliminary separation with partial liquefaction (if after, then the lower boiling component which, in air, is the nitrogen) is diverted in the gaseous (or vaporous) state under pressure and is expanded with performance of work in an expansion engine, whereby the cold losses are covered. This quantity of gas is not needed for the formation of the required amount of wash liquid. The excess of compressed gas mixture, either as such mixture or as nitrogen separated by a preliminary separation, thus serves as the operating medium for an expansion engine in which it is expanded with the production of work and cold. It may be employed also in the exhaust condition for cooling wash liquid before the latter is expanded and introduced into an upper rectifier of an upper or subsequent and final separating apparatus.

The low pressure process may, as indicated above, be so carried out that an excess of the compressed gas mixture may be expanded in an expansion engine without preliminary separation and may, then, in the form of exhaust, be separated in an upper rectifier, that is by an after or subsequent separation, so that it may be conducted, likewise in the form of a lower boiling separated component (e. g. nitrogen), through the wash liquid cooler.

The procedure includes the following four steps: compression of all of a gaseous mixture to a low pressure to avoid accumulation of frost by subliming the latter with separated components in cold regenerators by alternate periodical reversed operation; partial liquefaction of the mixture for the purpose of reducing the power requirement; expansion of the excess of the compressed gas mixture, in the form either of the gas mixture or of a lower boiling component, in an expansion engine; and cooling of wash liquid with the exhaust of an expansion engine to prevent evaporation of liquid (during the expansion from condenser pressure to the pressure of another or upper rectifier) in order to cover the cold losses. These steps stand in very close relationship, for only through total compression and operation with cold accumulators, which are alternately and periodically reversed, can the collection of ice and frost be avoided without extensive pretreatment of the air or other mixture to be separated and without interruption of the process. Furthermore, only through partial liquefaction can the power requirement be considerably reduced and this is possible to a full extent and without loss of compressor energy only by a thorough cooling of the wash liquid, for that portion of the wash liquid which is vaporized during the expansion to the pressure of the upper rectifier causes a useless expenditure of compression energy.

As is known, the continuous operation of gas separating plants requires an addition of cold in the form of liquefied gas. According to the present invention the excess of compressor energy expended, when all of the gas mixture is compressed, over and above the amount of energy required for effecting partial liquefaction, is employed to produce additional cold in an expansion engine. This cold output is used to cool wash liquid before it is expanded, so that in this way liquid for covering the cold losses is retained, and at the same time a loss of compressor energy by evaporation of wash liquid during expansion is avoided.

The employment of periodically reversed operation with cold accumulators or regenerators is interlinked with the low pressure compression of the gas mixture and with the subsequent cooling of the wash liquid. Without this cooling loss of cold in the accumulators could not be avoided because the discharged lower boiling separated component is always at a temperature which is ten to twenty degrees lower than that of the incoming compressed gas mixture. In the use of continuously operating tubular cold exchangers of any known type, there arises from such fact no disadvantage because the cold excess of the lower boiling component in the form of a lower temperature causes in such exchangers a partial liquefaction of the introduced gas mixture. This occurs indeed also in cold accumulators, when a compressed gas mixture is introduced into the accumulators previously cooled by a low boiling component which is cooler by ten to twenty degrees but the liquid cannot be drawn off, since it clings in the form of dew to the surfaces of the lower part of the accumulator packing. The dew is, however, immediately evaporated when, upon reversed operation, an accumulator is again under no pressure and this cold is then carried out at the top and lost.

This loss of cold, when air is being separated, may be explained as follows: The air which has been compressed to about 4 atmospheres becomes liquid at a temperature of −178° C.; the escaping separated nitrogen has, however, a temperature of −196° C. and is thus about 18° colder, so that a cold accumulator through which at any moment nitrogen is being discharged is strongly super-cooled. When, upon reversal, compressed air of 4 atmospheres is introduced into this accumulator a small portion thereof becomes liquefied upon the super-cooled surfaces of the lower part of the accumulator packing, and clings to the latter in the form of dew. If this accumulator is again reversed and nitrogen discharged therethrough, the dew immediately completely vaporizes because when under no pressure it can exist in the condensed condition only at −193° C. or below. Consequently this very considerable quantity of cold is lost inasmuch as the cold zone of the accumulator packing rises constantly higher and hence after some time the excess cold of the lower boiling component (nitrogen) escapes at the top. In order to avoid this loss, the lower boiling component, according to the present invention, is first brought into cold exchange with warmer wash liquid and warmed to approximately the liquefying temperature of the compressed gas mixture.

According to this invention air can be separated into its main constituents by simple compression to 3 to 4 atmospheres without any pretreatment, and the apparatus required for carrying out the same includes in combination a low pressure compressor (for large plants, a turbo-compressor can be used), an expansion-piston engine or turbine, and two pairs of cold accumulators, in addition to the separator for effecting a preliminary separation, and a subsequent rectification. For obtaining commercially pure oxygen only one pair of cold regenerators is necessary and in place of the second a counter-current tubular exchanger may be used.

Figure 2:
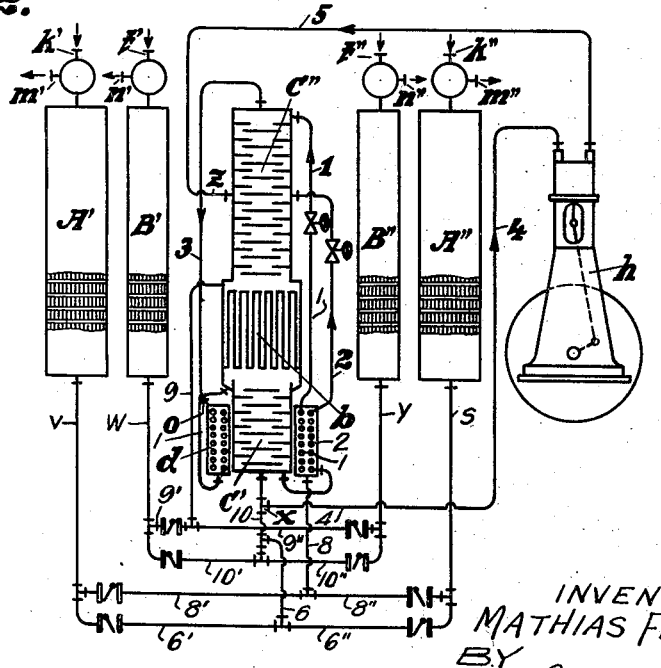

For a fuller understanding of the nature and objects of the invention reference should be had to the following detailed description taken in connection with the accompanying drawing, in which:

Figure 1 illustrates diagrammatically a plant embodying the present invention and employing a part of the compressed nitrogen in the vapor state for operating the expansion engine; and Figure 2 is a similar diagrammatic view showing a plant in which part of the compressed air is used as such to operate the expansion engine.

The apparatus illustrated in Figure 1 includes cold regenerators $A'$, $A''$, and $B'$, $B''$, an evaporator-condenser $b$, a lower rectifier $c'$ operating at a pressure greater than atmospheric, an upper rectifier $c''$ operating at substantially atmospheric, an after or super-cooler $d$ for wash liquid and an expansion engine $h$.

About three-fourths to four-fifths of the air to be separated is conducted under pressure to the cold accumulator $A'$ through a reversing valve which it enters at $k'$; is cooled in this accumulator to −175° C. and is then conducted by conduits $v$, $6'$, $6$ and $10$ to the lower rectifier $c'$ and therein separated into gaseous nitrogen and a liquid containing about 40 per cent oxygen. The nitrogen then passes to the condenser side of the oxygen evaporator $b$ and from one-half to three-fourths thereof is liquefied, whereupon the liquid nitrogen is conducted by conduit 1 to the head of the upper rectifier $c''$ while the liquid oxygen is introduced at the middle of said upper rectifier through conduit 2 in order to act as wash liquid for the oxygen vapors rising from the evaporator side of evaporator-condenser $b$. About one-fourth to one-half of the gaseous nitrogen at a temperature of −175° C. is conducted to the expansion engine $h$ by conduit 4 and is expanded therein to 0.1 atmosphere and cooled to −196° C. A small portion of the nitrogen is liquefied under these conditions, so that a super-saturated vapor containing about 5 per cent of liquid in the form of a mist is produced, which is then led by conduit 3 to the super-cooler $d$, as indicated at $o$. The yield of cold that can be obtained amounts theoretically to 8 Cal., but practically about 5 Cal./kg. of air are obtained.

The exhaust nitrogen, conduit 3, together with the separated nitrogen from the upper rectifier, conduit 7, passes through the cooler $d$ for the wash liquid, there gives up sensible cold and rises in temperature from −196° C. to −180° C. The wash liquid, produced at a pressure of 3 atmospheres, is thus cooled from −178° C. to −190° C. Thereby partial evaporation thereof, when it is charged into the upper rectifier and the pressure thereon reliever, is prevented so that a larger amount remains as liquid which serves to take care of the cold losses.

The nitrogen passes from the super-cooler, conduits 8, 8'' and $s$, to the cold regenerator $A''$ and escapes at $m''$ after giving up its cold to the packing in such regenerator. At intervals of a few minutes the reversing valves are operated in any suitable manner, as for example a compressed air engine (not shown) and the direction of flow of the incoming air and the separated components through the regenerators is reversed. The compressed air then enters accumulator $A''$ at $k''$, is conducted by conduits $s$, $6''$, 6 and 10 to the lower rectifier $c'$, and the nitrogen is conducted by conduits 8, 8' and $v$ from the super-cooler to the cold accumulator $A'$, and leaves the apparatus at $m'$.

In this manner the compressed air entering through regenerators $A'$ and $A''$ always takes up the cold which was given up to them by the nitrogen passing therethrough in opposite direction during the previous reverse operating period. The oxygen, on the other hand, is removed from the evaporator $b$ by conduit 9, and alternately withdrawn through the accumulators $B'$ and $B''$ at $n'$ and $n''$ having passed to said accumulators by conduits 9' and $w$, and 9'' and $y$ respectively. Through these regenerators one-fourth to one-fifth of the compressed air to be separated is alternately introduced at $t'$ and $t''$ in order to take up sensible cold deposited by the oxygen, and is then conducted by conduits $w$ and 10', or by $y$ and 10'' respectively, and pipe 10, from the cold accumulators to the lower rectifier $c'$.

In order to obtain, for example, 250 cbm. of oxygen of 75 per cent purity, one thousand cbm. of air are compressed to 3 atmospheres, are conducted through the regenerators and preliminarily separated in the lower rectifier $c'$ into a liquid containing about 40 per cent oxygen, and pure nitrogen. From the rectifier $c'$, 300 cbm. of nitrogen are conducted, conduit 4, Fig. 1, to the expansion engine and there expanded to about 0.2 atmospheres. The exhaust nitrogen, together with the separated nitrogen discharged from the upper rectifier $c''$, is then conveyed, conduits 7 and 3, to the super-cooler $d$. The cold yield from these 300 cbm. of nitrogen obtainable from the work output of the expansion engine amounts to 360×5=1800 cals. (since 300 cbm. of nitrogen correspond to 360 kg. of air). This quantity of cold is delivered by the expansion engine not in the form of liquid air but as the sensible cold of the exhaust nitrogen.

The problem consists in converting the sensible cold of the exhaust into liquid. This is effected in that the liquid wash is cooled by the cold of the exhaust, together with that of the separated nitrogen from the upper rectifier, while the air for the operation of the expansion engine is separated into its main components by a preliminary separation at a pressure greater than atmospheric.

The separation of the air for the operation of the expansion engine can, however, also take place subsequently as exhaust. In such case the operating medium of such engine is not removed as nitrogen in the upper part of the pressure separator $c'$, but is withdrawn as compressed air from the conduit 10 (Fig. 2) at point $x$ connected directly to the regenerators. The exhaust air is then conducted, conduit 5, to the upper rectifier $c''$, wherein it is separated. It is only subsequent to this separation that it is conveyed, as nitrogen and forming part of the total volume of separated nitrogen, through the cooler $d$ in order to cool the wash liquid.

The modification of the apparatus according to my invention in which the exhaust of the expansion engine is subsequently separated, is illustrated in Figure 2. The removal of the operating air for the expansion engine takes place at $x$ and the exhausted air is conveyed by conduit 5 into the upper rectifier $c''$ which it enters at $z$.

The prevention of frost accumulation by sublimation is possible only with periodically reversed operation with cold accumulators. It is not possible with continuously operating cold exchangers. The operation with cold regenerators under periodical reversal presupposes that the separated components are discharged through the same space through which they are introduced into the apparatus in the form of the original mixture. This is not, however, the case with continuously operated cold exchangers since the inlet and outlet spaces of such apparatus are separated from each other by the heat-conducting walls or surfaces.

It will be clear from the above that, inasmuch as air or other gaseous mixture is introduced under a compression of several atmospheres, while the separated components are discharged under substantially no pressure, the volume of such escaping separated components is considerably larger than the volume of the incoming mixture. As the capacity of a gas for taking up vapors is a function of its volume and not of its weight, it will be evident that the moisture and carbon dioxide or other high boiling impurities deposited by the incoming mixture in the regenerator will be completely sublimed and carried off by the separated components passing through the regenerators upon reversal.

Heretofore a minimum pressure of 15 atmospheres was always necessary for the operation of such plants in order to provide both for the separation of the mixture and also for covering unavoidable cold losses; or else, a part of the gas mixture to be separated had to be compressed to 50 to 60 atmospheres. Such pressures, however, are uneconomical for alternating reversed operation with cold accumulators. Former processes, furthermore, always required a special pre-treatment with chemicals, scrubbing with lye, or cooling, in order to prevent the collection of frost, and expensive multi-stage compressors had to be provided. Turbo-operation was heretofore not applicable because of the high pressure, when a separate plant for the production of additional liquid air was not to be erected, and likewise reversed operation with cold regenerators for effecting the cold exchange is excluded when the operation goes much above 4 atmospheres, because then the loss of compressed air upon reversal becomes too great.

Moreover, it has not been possible up to the present time, in spite of the complicated pretreatment of the air mixture with chemicals, washing with lye, and cooling, to operate existing plants without interruption due to freezing. The apparatus for the pre-treatment, together with the expensive compressor plant, increased the cost of such plants so much that a general introduction of the separation of nitrogen from the air for the operation of iron mills never found favor, and adaptation to the chemical industry was prevented by the high operating costs, even disregarding the high power requirement, the great diversity of apparatus, the chemicals required, and the interruption of operation because of freezing. The latter also affect unfavorably the investment cost of the plant, as ordinarily reserve apparatus is provided.

Accordingly, the apparatus herein described effects the separation of high boiling impurities from a gaseous mixture in cold regenerators and the removal therefrom by a subsequent flow in a reversed direction of separated components. It is consequently not necessary to subject gaseous mixtures such as air to expensive pretreatments to remove high boiling impurities therefrom.

Variations may be resorted to within the scope of the appended claims without departing from the spirit of the invention. For example, the component present in smaller quantity need not be discharged through a regenerator, but may be conducted out of the apparatus through a recuperator or tubular exchanger. Thus oxygen, or other gas, of a higher degree of purity may be obtained since it does not become mixed with the air or gas remaining in the regenerator upon reversal; or the oxygen may be withdrawn in liquid form from the apparatus.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also be understood that the following claims are intended to cover all of the generic and specific features of the invention herein described, and all statements of the scope of the invention which, as a matter of language, might be said to fall therebetween.

I claim:

1. An apparatus for separation of components from a gaseous mixture including in combination a plurality of regenerators having regenerative packing therein and wherein said gas mixture is cooled, means for effecting separation of said cooled gaseous mixture by fractional evaporation into higher and lower boiling components an expansion engine wherein a part of the cooled gaseous mixture is expanded with further cooling, a conduit for conducting a part of the gaseous mixture to said engine, a heat interchanger, a conduit whereby exhaust gas from said engine is conducted to said interchanger to be warmed therein and conduits connecting said regenerators and said separation means in operative relations whereby gaseous mixture and separated components are conducted to and from said regenerators and said separation means.

2. An apparatus for separation of nitrogen and oxygen components from air including in combination a plurality of regenerators having a regenerative packing therein and wherein said air is cooled, means for effecting separation of said cooled air by fractional evaporation into nitrogen and a wash liquid enriched in oxygen, an expansion engine wherein separated nitrogen is further cooled by expansion, a conduit for conducting a part of the compressed nitrogen from the said separating means to said engine, a heat interchanger and conduits for conducting the wash liquid produced in said separating means, the exhaust from said engine and the low pressure nitrogen from the top of said separating means to said interchanger whereby said wash liquid is precooled and evaporation thereof on decompression reduced.

3. An apparatus for separation of components from a compressed gaseous mixture utilizing regenerative refrigeration, comprising in combination a plurality of regenerators having regenerative packing therein and wherein said gaseous mixture is cooled, means for effecting separation of said cooled gaseous mixture by fractional evaporation into higher and lower boiling components, an expansion means wherein cooled gas is expanded with further cooling, a conduit for conducting said cooled gas to the expansion means and a conduit whereby expanded gas from said expansion means is conducted to the separation system wherein it serves to cover cold losses, and conduits connecting said regenerators and said separation means in operative relations whereby gaseous mixture is conducted to and separated components from said regenerators and said separation means.

4. An apparatus for separation of components from a compressed gaseous mixture utilizing regenerative refrigeration, comprising in combination a plurality of regenerators having metallic packing therein and wherein said gaseous mixture is cooled, means for effecting separation of said cooled gaseous mixture by fractional evaporation into higher and lower boiling components, means for expanding cooled gas whereby such gas is further cooled and serves to cover cold losses, a conduit for conducting cooled gas to said expansion means, means for effecting an interchange of heat between a liquid higher boiling and a gaseous lower boiling separated component of the gaseous mixture whereby cold losses are further covered, means whereby gas expanded in said expansion means is conducted to the heat exchange means to be warmed therein, and conduits connecting said regenerators and said separation means in operative relations whereby gaseous mixture and separated components are conducted to and from said regenerators and said separation means.

5. An apparatus for the separation of components from compressed gaseous mixture utilizing regenerative refrigeration, comprising in combination a plurality of regenerators having metallic packing therein and wherein said gaseous mixture is cooled, a rectifying column for effecting separation of said cooled gaseous mixture into higher and lower boiling components, an expansion engine wherein cooled gas is further cooled, a conduit for conducting cooled gas to said expansion engine, a heat interchanger wherein interchange of heat is effected between a liquid higher boiling and a gaseous lower boiling separated component, conduits whereby gas expanded in said expansion engine is conducted to the heat interchanger to be warmed therein, and conduits connecting said regenerators and said rectifying column in operative relations whereby gaseous mixture and separated components are conducted to and from said regenerators and said rectifying column.

6. An apparatus for separation of components from a compressed gaseous mixture utilizing regenerative refrigeration, comprising in combination a plurality of regenerators having metallic packing therein and wherein said gaseous mixture is cooled, means for effecting separation of said cooled gaseous mixture by fractional evaporation into higher and lower boiling components, means for expanding a portion of said cooled gaseous body whereby said portion is further cooled and cold losses covered, a conduit for conducting a portion of the cooled gaseous body to said expansion means, a heat interchanger, a conduit whereby gas expanded in said expansion means is conducted to said interchanger to be warmed therein, a conduit for charging a warm gaseous mixture to one regenerator, a conduit for conducting a cold separated component away from a second regenerator, the packing in said second regenerator being chilled by the passage therethrough of the cold component, and means for alternately and periodically reversing the flow of gases through said regenerators.

MATHIAS FRÄNKL.